United States Patent
Iwata et al.

(10) Patent No.: US 9,677,021 B2
(45) Date of Patent: Jun. 13, 2017

(54) SLIDING MEMBER

(71) Applicant: DAIDO METAL COMPANY LTD., Nagoya (JP)

(72) Inventors: Hideki Iwata, Inuyama (JP); Yasushi Saito, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 82 days.

(21) Appl. No.: 14/711,093

(22) Filed: May 13, 2015

(65) Prior Publication Data

US 2015/0329795 A1 Nov. 19, 2015

(30) Foreign Application Priority Data

May 14, 2014 (JP) .................................. 2014-100876
Jul. 7, 2014 (JP) .................................. 2014-140087

(51) Int. Cl.
*C10M 103/04* (2006.01)
*B32B 15/00* (2006.01)
(Continued)

(52) U.S. Cl.
CPC ........... *C10M 103/04* (2013.01); *B22F 7/004* (2013.01); *B32B 15/015* (2013.01); *B32B 15/043* (2013.01); *B32B 15/08* (2013.01); *B32B 15/18* (2013.01); *C22C 1/0433* (2013.01); *C22C 1/08* (2013.01); *C23C 30/00* (2013.01);
(Continued)

(58) Field of Classification Search
CPC ......... C23C 30/00; C23C 30/005; C22C 1/08; C22C 1/0433; B32B 15/043; B32B 15/08; B32B 15/18; B32B 15/015; Y10T 428/12479; Y10T 428/12556; Y10T 428/12569; Y10T 428/12937; Y10T 428/12944; Y10T 428/12958; Y10T 428/12965; Y10T 428/12972;
(Continued)

(56) References Cited

U.S. PATENT DOCUMENTS

| 9,360,048 | B2* | 6/2016 | Iwata | F16C 33/128 |
| 2008/0146467 | A1* | 6/2008 | Takayama | B22F 3/1035 |
| | | | | 508/105 |
| 2016/0160824 | A1* | 6/2016 | Iwata | F02M 59/445 |
| | | | | 428/553 |

FOREIGN PATENT DOCUMENTS

JP 2001-355634 A 12/2001
JP 2002-061653 A 2/2002
(Continued)

*Primary Examiner* — Michael E La Villa
(74) *Attorney, Agent, or Firm* — Harness, Dickey & Pierce, PLC (57) ABSTRACT

Provided is a sliding member having: a back metal layer; and a sliding layer on the back metal layer. The sliding layer includes a porous sintered layer and a resin composition. The sintered layer includes Ni—P alloy phase and granular steel phase made of a carbon steel including 0.3-1.3 mass % of carbon and having a structure of: ferrite phase; and perlite phase, or perlite phase and cementite phase. The Ni—P alloy phase binds the steel phases with one another and/or binds the steel phases with the back metal layer. The steel phase includes a low perlite phase part in a surface. The low perlite phase part has an area ratio of the perlite phase lowered by 50% or more compared with a total area ratio of the perlite phase and the cementite phase at a central part of the steel phase when observed in a cross-section.

7 Claims, 5 Drawing Sheets

(51) Int. Cl.
  *B32B 15/04* (2006.01)
  *B32B 15/18* (2006.01)
  *B32B 15/01* (2006.01)
  *C23C 30/00* (2006.01)
  *B32B 15/08* (2006.01)
  *B22F 7/00* (2006.01)
  *F16C 33/14* (2006.01)
  *F16C 33/10* (2006.01)
  *C22C 1/04* (2006.01)
  *C22C 1/08* (2006.01)
  *B22F 3/11* (2006.01)
  *B22F 3/26* (2006.01)

(52) U.S. Cl.
  CPC .......... *C23C 30/005* (2013.01); *F16C 33/104* (2013.01); *F16C 33/1095* (2013.01); *F16C 33/145* (2013.01); *B22F 3/11* (2013.01); *B22F 3/26* (2013.01); *B22F 2998/10* (2013.01); *B22F 2999/00* (2013.01); *F16C 2202/52* (2013.01); *F16C 2202/54* (2013.01); *F16C 2204/60* (2013.01); *F16C 2240/06* (2013.01); *F16C 2240/48* (2013.01); *F16C 2300/22* (2013.01); *F16C 2360/00* (2013.01); *Y10T 428/12479* (2015.01); *Y10T 428/12556* (2015.01); *Y10T 428/12569* (2015.01); *Y10T 428/12931* (2015.01); *Y10T 428/12937* (2015.01); *Y10T 428/12944* (2015.01); *Y10T 428/12958* (2015.01); *Y10T 428/12965* (2015.01); *Y10T 428/12972* (2015.01); *Y10T 428/26* (2015.01); *Y10T 428/264* (2015.01); *Y10T 428/265* (2015.01)

(58) Field of Classification Search
  CPC ........... Y10T 428/12931; Y10T 428/26; Y10T 428/264; Y10T 428/265
  See application file for complete search history.

(56) References Cited

FOREIGN PATENT DOCUMENTS

| | | |
|---|---|---|
| JP | 2002-180162 A | 6/2002 |
| JP | 2013-083304 A | 5/2013 |
| JP | 2013-217493 A | 10/2013 |
| JP | 2013-237898 A | 11/2013 |

* cited by examiner

SLIDING MEMBER

CROSS-REFERENCE TO RELATED APPLICATIONS

This application claims the benefit of priority from Japanese Patent Application No. 2014-100876 filed on May 14, 2014 and Japanese Patent Application No. 2014-140087 filed on Jul. 7, 2014, the entire disclosures of which are incorporated herein by reference.

BACKGROUND OF THE INVENTION (1) Field of the Invention

The present invention relates to a sliding member having a sliding layer including a porous sintered layer and a resin composition, which has high corrosion resistance and high bonding strength between the resin composition and the porous sintered layer.

(2) Description of Related Art

Sintered copper based materials having a porosity of approximately 5-25% have been conventionally used for a sliding member of a fuel injection pump. A liquid fuel is supplied from an outer surface side of a cylindrical sliding member to an inner surface (sliding surface) side thereof through pores existing in the sliding member, and the sliding member is provided with a lubricating fluid film of the liquid fuel on the inner surface (sliding surface) to support a high-speed rotating shaft. Such sintered copper materials have a problem that a copper alloy is subjected to corrosion due to organic acids or sulfur contained in the fuel, and then the copper corrosion products contaminate the fuel. For this reason, sintered copper based sliding materials including Ni, Al and Zn have been proposed to improve the corrosion resistance (see e.g. JP-A-2002-180162, JP-A-2013-217493 or JP-A-2013-237898).

On the other hand, sliding members made of multi-layered sliding materials have been conventionally used. The multi-layered sliding materials include a porous sintered layer of a copper alloy provided on a surface of a steel back metal through a copper-plated layer, and further, pores and a surface of the porous sintered layer are impregnated and covered with a resin composition (see e.g. JP-A-2002-61653 and JP-A-2001-355634). It has been proposed to apply such multi-layered sliding materials to the sliding member of the fuel injection pump (see e.g. JP-A-2013-83304).

SUMMARY OF THE INVENTION

Although the sintered copper based sliding members of JP-A-2002-180162, JP-A-2013-217493 and JP-A-2013-237898 have corrosion resistance by including Ni, Al and Zn, the corrosion of the copper alloy due to organic acids or sulfur contained in the fuel can not be completely prevented. Moreover, the sintered copper based sliding materials of these documents have a low strength since they include pores throughout the sliding member, and have an insufficient loading capability especially for a sliding member used for a common rail-type fuel injection pump shown in JP-A-2013-83304 etc.

The multi-layered sliding materials of JP-A-2002-61653, JP-A-2001-355634 and JP-A-2013-83304 have a high strength since they include the steel back metal. However, the porous sintered layer composed of a copper alloy is subjected to the corrosion of the copper alloy by organic acids or sulfur contained in the fuel or lubricating oil. For the sliding materials which are produced by simply spreading and then sintering a carbon steel powder on a surface of a steel back metal to form a porous sintered layer, without providing a copper-plated layer on the surface of the steel back metal like those of the above documents, and then impregnating and covering the porous sintered layer with a resin composition, it has been also revealed that the sliding materials have a lower bonding strength at an interface between the porous sintered layer and the resin composition in the sliding layer.

The present invention has been made in view of the above-described circumstances, and has an object to provide a sliding member having high corrosion resistance as well as a high bonding strength between a porous sintered layer and a resin composition in a sliding layer.

In order to achieve the object, a first aspect of the present invention provides a sliding member comprising: a back metal layer; and a sliding layer on the back metal layer. The sliding layer includes a porous sintered layer and a resin composition. The porous sintered layer includes Ni—P alloy phase and granular steel phase, and the granular steel phase is made of a carbon steel including 0.3-1.3 mass % of carbon and having a structure consisting essentially of     ferrite phase, and     perlite phase, or perlite phase and cementite phase.

The Ni—P alloy phase functions as a binder that binds the granular steel phases with one another and/or binds the granular steel phases with the back metal layer. The granular steel phase includes a low perlite phase part in a surface thereof. The low perlite phase part has an area ratio of the perlite phase lowered by 50% or more compared with a total area ratio of the perlite phase and the cementite phase in the structure at a central part of the granular steel phase when observed in a cross-section.

If the granular steel phase consists essentially of the ferrite phase and the perlite phase, the "total area ratio of the perlite phase and the cementite phase" is the area ratio of the perlite phase.

In the sliding member according to the first aspect of the present invention, the porous sintered layer, that constitutes the sliding layer, includes the Ni—P alloy phase and the granular steel phase, and thus has high corrosion resistance against organic acids or sulfur. The Ni—P alloy phase in the porous sintered layer functions as a binder that binds the granular steel phases with one another and/or binds the granular steel phases with the back metal layer. The steel phase is made of a carbon steel including 0.3-1.3 mass % of carbon, and having a structure consisting essentially of     the ferrite phase and the perlite phase, or     the ferrite phase, the perlite phase, and the cementite phase.

If a carbon steel includes lower than 0.3 mass % of carbon, the porous sintered layer has a low strength and thus the sliding member has an insufficient strength. On the other hand, if the carbon steel includes higher than 1.3 mass % of carbon, a ratio of the perlite phase in the low perlite phase part of the steel phase becomes excess. Furthermore, the low perlite phase part, which has a ratio of the perlite phase is lowered by 50% or more compared with the perlite phase at the central part of the granular steel phase when the granular steel phase has the ferrite phase and the perlite phase, is formed in the surface of the granular steel phase facing the Ni—P alloy phase or the resin composition in the sliding layer. On the other hand, when the granular steel phase has the ferrite phase, the perlite phase and the cementite phase, the low perlite phase part, which has the ratio of the perlite phase lowered by 50% or more compared with a phase mixture of the perlite phase and the cementite phase at the central part of the granular steel phase, is formed in the surface of the granular steel phase. Thus, difference of thermal expansion at an interface between the resin composition in the sliding layer and the low perlite phase part of the granular steel phase is small. Therefore, shearing at the interface therebetween is less likely to occur and a bonding strength between the granular steel phase and the resin composition in the sliding layer is increased. Simultaneously, shearing at an interface between the Ni—P alloy phase and the low perlite phase part is less likely to occur, and strength of the porous sintered layer is increased. Even if the granular steel phase has the ferrite phase, the perlite phase and the cementite phase, the low perlite phase part is composed of the ferrite phase and the perlite phase and does not include the cementite phase (except cementite that constitutes the perlite phase). When the granular steel phase has the ferrite phase and the perlite phase, the low perlite phase part may have a structure composed of only ferrite phase.

In an embodiment, the granular steel phase may have an average grain size of 45-180 μm. Thus, the porous sintered layer is provided with pores suitable for the impregnation by the resin composition. If the average grain size is less than 45 μm, a size of each pore in the porous sintered layer is reduced, thereby the impregnation with the resin composition into the porous sintered layer is difficult. On the other hand, if the average grain size is more than 180 μm, the low perlite phase part will not be formed in a part of the surface of the granular steel phase.

In an embodiment, nickel may be diffused from the Ni—P alloy phase into the low perlite phase part. This can increase a bonding strength with the Ni—P alloy phase or the resin composition in the sliding layer.

In an embodiment, the low perlite phase part may have a thickness of 1-30 μm. The low perlite phase part having a thickness of 30 μm or less does not affect strength of the granular steel phase. On the other hand, if the thickness is less than 1 μm, the low perlite phase part may partially fail to be formed in a part of the surface of the granular steel phase.

In an embodiment, an area ratio of the perlite phase on a surface of the low perlite phase part may be 0-10%. When the area ratio of the perlite phase is 10% or less, improved is an effect of increasing the bonding strength between the granular steel phase and the Ni—P alloy phase or the resin composition in the sliding layer.

In an embodiment, the Ni—P alloy phase may comprise 9-13 mass % of P and the balance of Ni and inevitable impurities. The Ni—P alloy can have a low melting point in the compositional range. More desirably, the Ni—P alloy phase may comprise 10-12 mass % of P and the balance of Ni and inevitable impurities. In a heating step for sintering the porous sintered layer on the back metal layer, the Ni—P alloy phase in the porous sintered layer are all liquefied, and Ni diffuses into the surface of the granular steel phase. The Ni diffusion into the surface of the granular steel phase has an effect on formation of the low perlite phase part in the surface of the granular steel phase. If the Ni—P alloy phase includes lower than 9 mass % or higher than 13 mass % of P, the melting point of the Ni—P alloy becomes higher. This reduces an amount of generation of the liquid-phase of the Ni—P alloy during sintering, and thus Ni is less likely to be diffused into the surface of the granular steel phase and the low perlite phase part is less likely to be formed in the surface of the granular steel phase.

In an embodiment, the Ni—P alloy phase may include: 9-13 mass % of P; optionally one or more selected from 1-4 mass % of B, 1-12 mass % of Si, 1-12 mass % of Cr, 1-3 mass % of Fe, 0.5-5 mass % of Sn and 0.5-5 mass % of Cu; and the balance of Ni and inevitable impurities. A range of P content is as described above. One or more selected from 1-4 mass % of B, 1-12 mass % of Si, 1-12 mass % of Cr, 1-3 mass % of Fe, 0.5-5 mass % of Sn and 0.5-5 mass % of Cu may be optionally included to adjust the strength of the Ni—P alloy phase. When the Ni—P alloy phase includes the optional elements, it does not affect the formation of the low perlite phase part in the surface of the granular steel phase. If the Ni—P alloy phase includes Cu, the Cu content needs to be not higher than 5 mass % so as not to affect the corrosion resistance of the Ni—P alloy phase.

In an embodiment, a ratio of the Ni—P alloy phase in the porous sintered layer may be 5-40 parts by mass in relation to 100 parts of the porous sintered layer. The Ni—P alloy phase functions as a binder that binds the granular steel phases with one other and/or binds the granular steel phases with the back metal layer. If the ratio of the Ni—P alloy phase is lower than 5 parts by mass, strength of the porous sintered layer and bonding strength between the porous sintered layer and the back metal layer become insufficient. On the other hand, if the ratio of the Ni—P alloy phases is higher than 40 part by mass, the porous sintered layer has too low porosity since portions which should be left as pores are filled with the liquid-phase of the Ni—P alloy during the sintering step.

A second aspect of the present invention provides a sliding member comprising: a back metal layer; and a sliding layer on the back metal layer, the sliding layer including a porous sintered layer on a surface of the back metal layer and a resin composition impregnating pores and covering a surface of the porous sintered layer, wherein the porous sintered layer includes granular steel phase on the back metal layer, and Ni—P alloy phase functioning as a binder for binding the granular steel phases with one another and/or binds the granular steel phases with the back metal layer, wherein the granular steel phase is made of a carbon steel including 0.8-1.3 mass % of carbon and having a structure consisting essentially of ferrite phase, and mixed phase of perlite phase and cementite phase, wherein the granular steel phase is composed of a sliding surface side steel phase grain group placed on a sliding surface side of the porous sintered layer, and an interface side steel phase grain group placed on an interface (with back metal layer) side of the porous sintered layer, wherein an average area ratio of the ferrite phase in the structure of the granular steel phase is not higher than 10% in the sliding surface side steel phase grain group when observed in a cross-section, while the average area ratio of the ferrite phase in the structure of the granular steel phase is not lower than 20% in the interface side steel phase grain group.

In the sliding member according to the second aspect of the present invention, the porous sintered layer that constitutes the sliding layer includes: a plurality of stacks of granular steel phases (that is, more than one layer of the granular steel phases) stack on a surface of the back metal layer when observed in a cross-sectional view; and the Ni—P alloy phase functioning as a binder for binding the granular steel phases with one another and/or binds the granular steel phases with the back metal layer, thereby it has high corrosion resistance against organic acids and sulfur. The steel phase is made of a carbon steel including 0.8-1.3 mass % of carbon and having a structure consisting essentially of the ferrite phase, and the mixed phase of the perlite phase and the cementite phase. Since the carbon steel includes not lower than 0.8 mass % of carbon, the porous sintered layer has high strength and the sliding member has particularly high wear resistance. If the carbon steel includes lower than 0.8 mass % of carbon, the porous sintered layer has low strength and the sliding member has insufficient wear resistance. If the carbon steel includes higher than 1.3 mass % of carbon, an average area ratio of the ferrite phase in the structure of the steel phase in the interface side steel phase grain group described later is likely to be less than 20%.

In the sliding surface side steel phase grain group placed on the sliding surface side of the porous sintered layer among a plurality of stacks of the granular steel phases when observed in a cross-sectional view, an average area ratio of the ferrite phase in the structure of the granular steel phase is not more than 10%, thereby wear resistance of the porous sintered layer is increased. If the resin composition covering the surface of the porous sintered layer wears during the sliding member is used, the granular steel phase in the sliding surface side steel phase grain group is exposed on the sliding surface. Since the granular steel phase in the sliding surface side steel phase grain group is hard due to not more than 10% of the average area ratio of the ferrite phase, the wear resistance of the sliding layer is increased. If the average area ratio of the ferrite phase in the structure of the granular steel phase in the sliding surface side steel phase grain group is more than 10%, an effect of the wear resistance of the sliding layer is reduced. On the other hand, the interface side steel phase grain group placed on the interface side of the porous sintered layer has the average area ratio of the ferrite phase in the structure of the granular steel phase is not more than 20%. Thus, difference in thermal expansion at an interface between the resin composition in the sliding layer and the steel phase in the interface side steel phase grain group is small. This makes it difficult that shearing at the interface therebetween occurs, and increases bonding strength between the resin composition and the granular steel phase. Simultaneously, shearing at an interface between the Ni—P alloy phase and the steel phase in the interface side steel phase grain group can be less likely to occur, and strength of the porous sintered layer is increased.

DETAILED DESCRIPTION OF THE INVENTION

Figure 10:
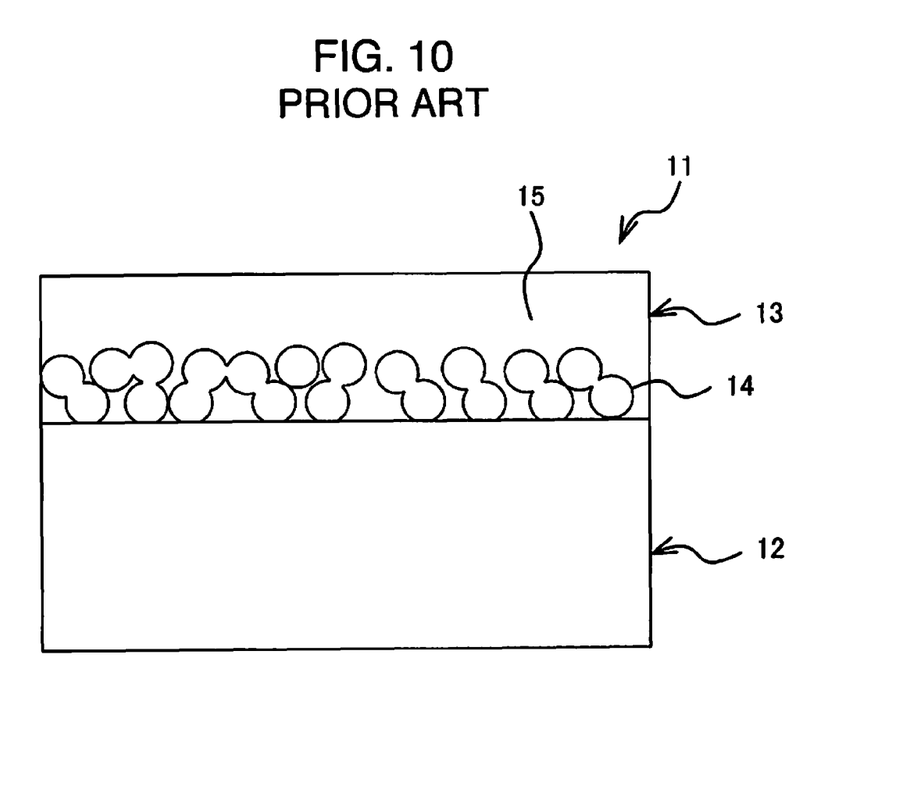
FIG. 10 is a schematic view showing a conventional sliding member.

First, referring to FIG. 10, a conventional sliding member 11 will be described with respect to bonding between a resin composition 15 and a porous sintered layer 14 in a sliding layer 13. FIG. 10 is a schematic view showing the conventional sliding member 11 provided with the porous sintered layer 14 formed by sintering a carbon steel (hypoeutectoid steel) powder having a structure of ferrite phase and perlite phase or a carbon steel (hypereutectoid steel) powder having a structure of perlite phase and cementite phase on a back metal layer 12. In a structure of the porous sintered layer 14 after sintering, there is no difference in ratio of the perlite phase between a surface of the porous sintered layer 14 (a surface of the carbon steel) and an inside of the porous sintered layer 14, and a large amount of perlite phase (or cementite phase) is formed even on the surface.

The surface of the porous sintered layer 14 (a surface of the carbon steel) facing the resin composition 15 includes a large amount of perlite phase, or the perlite phase and the cementite phase, and thus the porous sintered layer 14 has low bonding strength with the resin composition 15. As shown, if such a porous sintered layer 14 is used for the sliding member 11, shearing may locally occur at the interface between the resin composition 15 and the porous sintered layer 14. This is because shearing stress is generated at the interface between the resin composition 15 and the porous sintered layer 14 if a temperature of the sliding member 11 increases, since the resin composition 15 has higher thermal expansion than the porous sintered layer 14.

Specifically, the ferrite phase and the perlite phase in the porous sintered layer 14 have different coefficients of thermal expansion. The perlite phase includes cementite ($Fe_3C$) that is as iron carbide and thus has a lower coefficient of thermal expansion than the ferrite phase. Thus, when the temperature of the sliding member 11 increases, a shearing force generated by the difference in thermal expansion between the resin composition 15 and the porous sintered layer 14 becomes uneven at the interface. There is a large difference in thermal expansion at the interface between the resin composition 15 and the perlite phase in the porous sintered layer 14, and the shearing stress generated by the difference in thermal expansion forms a minute shearing portion. Also, it is considered that an area of the minute shearing increases as an area of the perlite phase in the surface of the porous sintered layer 14 increases, and the shearing propagates to the interface between the resin composition 15 and the ferrite phase in the porous sintered layer 14.

First Embodiment

Figure 1:
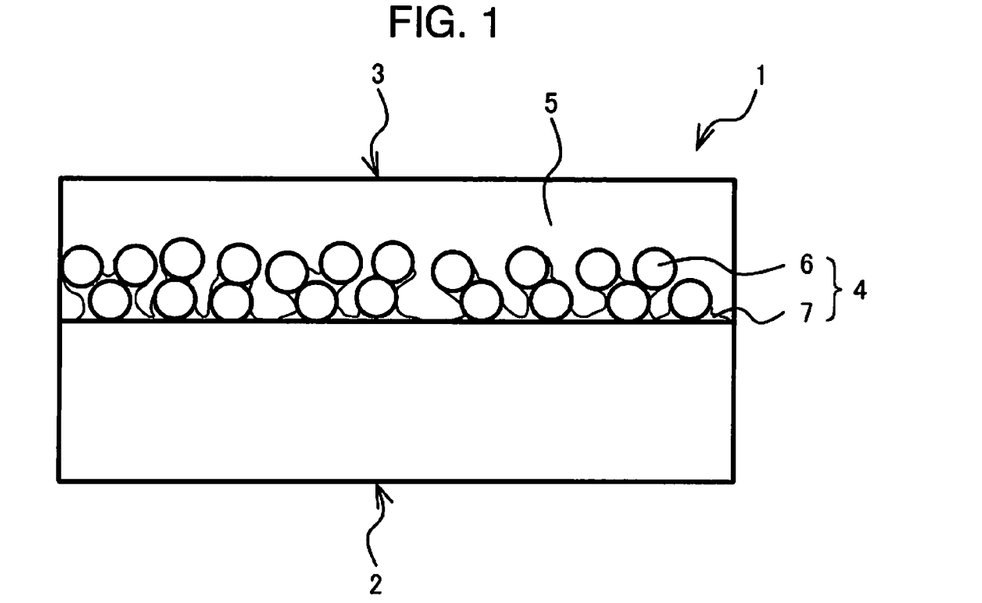
FIG. 1 is a schematic view showing a cross-section of a sliding member according to a first embodiment of the present invention.
Figure 2:
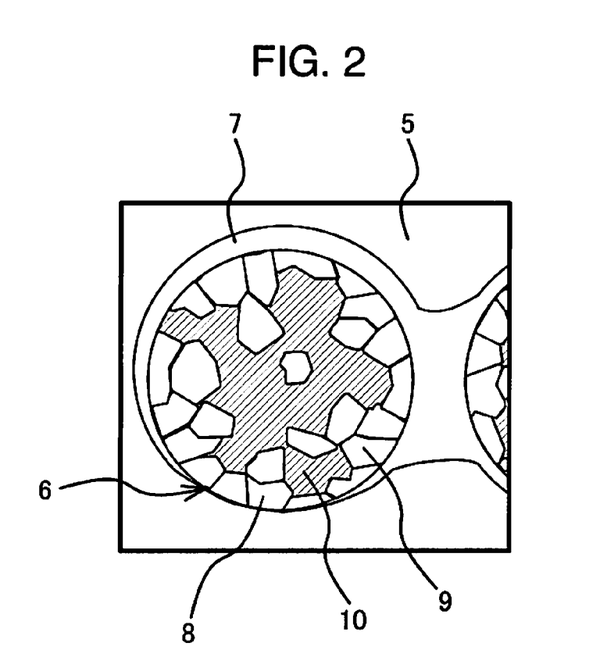
FIG. 2 is an enlarged view showing a structure of a granular steel phase in FIG. 1.

Next, referring to FIGS. 1 and 2, a sliding member 1 according to a first aspect of the present invention will be described. FIG. 1 is a schematic view showing a cross-section of the sliding member 1 having a sliding layer 3 including a porous sintered layer 4 and a resin composition 5 on a surface of a back metal layer 2. The porous sintered layer 4 includes Ni—P alloy phase 7 and granular steel phase 6. FIG. 2 is an enlarged view showing a structure of the granular steel phase 6.

As shown in FIG. 1, the sliding member 1 includes the back metal layer 2 and the sliding layer 3, and the sliding layer 3 includes the porous sintered layer 4 on the back metal layer 2 and the resin composition 5 impregnating pores and covering a surface of the porous sintered layer. The porous sintered layer 4 includes granular steel phase 6 and Ni—P alloy phase 7. The Ni—P alloy phase 7 functions as a binder that binds grains of the steel phase 6 with one another and/or binds the grains of the steel phase 6 with a surface of the back metal layer 2. As shown in FIG. 1, the Ni—P alloy phase 7 bonds the grains of the steel phase 6 with one another and/or bonds the grains of the steel phase 6 with the surface of the back metal layer 2. Partial direct contact or bond through sintering may be formed between the grains of the steel phase 6 and/or between the grains of the steel phase 6 and the surface of the back metal layer 2. The surfaces of the grains of the steel phase 6 are partially uncovered with the Ni—P alloy phase 7 in FIG. 1. However, all the grains of the steel phase 6 may be covered with the Ni—P alloy phase 7. The porous sintered layer 4 includes pores to be impregnated with the resin composition 5. The porosity thereof is 10-60%, more preferably 20-40%.

The Ni—P alloy phase 7 may have a composition of 9-13 mass % of P and the balance of Ni and inevitable impurities. In the compositional range, the Ni—P alloy phase 7 has a low melting point. More desirably, the Ni—P alloy phase 7 may include 10-12 mass % of P and the balance of Ni and inevitable impurities. In a heating step during sintering of the porous sintered layer 4 on the back metal layer 2, all of the Ni—P alloy phase 7 in the porous sintered layer 4 are liquefied, and Ni is diffused into the surface of the steel phase 6, as described later. The Ni diffusion into the surface of the steel phase 6 has an effect of formation of a low perlite phase part 8 in the surface of the steel phase 6. If the Ni—P alloy phase 7 includes lower than 9 mass % or higher than 13 mass % of P, the melting point of the Ni—P alloy is increased. This reduces an amount of generated liquid-phase Ni—P alloy during the sintering, and thus Ni is less likely to diffuse into the surface of the steel phase 6 and the low perlite phase part 8 is less likely to be formed in the surface of the steel phase 6.

The Ni—P alloy phase 7 may consist of: 9-13 mass % of P; optionally one or more selected from 1-4 mass % of B, 1-12 mass % of Si, 1-12 mass % of Cr, 1-3 mass % of Fe, 0.5-5 mass % of Sn and 0.5-5 mass % of Cu; and the balance of Ni and inevitable impurities. The Ni—P alloy phase 7 including the optional element/elements preferably has a structure in which an essential element P and optional element/elements B, Si, Cr, Fe, Sn and Cu are dissolved in a Ni matrix. However, it may have a structure in which the Ni matrix includes a secondary phase (precipitate, crystallize) thereof.

A ratio of the Ni—P alloy phase 7 in the porous sintered layer 4 may be 5-40 part by mass, more preferably 10-20 part by mass in relation to 100 part by mass of the porous sintered layer 4. The ratio of the Ni—P alloy phase 7 is suitable for forming the porous sintered layer 4 where the Ni—P alloy phase 7 is in a form of a binder that binds the grains of the steel phase 6 with one another and/or binds the grains of the steel phase 6 with the back metal layer 2. If the ratio is lower than 5 part by mass, strength of the porous sintered layer 4 and bonding strength between the porous sintered layer 4 and the back metal layer 2 are insufficient. On the other hand, if the ratio is higher than 40 part by mass, the porous sintered layer 4 has too low porosity since portions which should be left as pores are filled with the Ni—P alloy during sintering.

The granular steel phase 6 in the porous sintered layer 4 may have an average grain size of 45-180 μm. By using the steel phase 6 having the average grain size, the porous sintered layer 4 is provided with pores suitable for the impregnation of the porous sintered layer 4 with the resin composition 5. If the average grain size is less than 45 μm, a size of each pore in the porous sintered layer 4 is reduced, thereby it becomes difficult that the porous sintered layer 4 is impregnated with the resin composition 5. On the other hand, if the average grain size is more than 180 μm, the low perlite phase part 8 can not be formed in a part of the surface of the steel phase 6.

The granular steel phase 6 may be made of a carbon steel including 0.3-1.3 mass % of carbon, and commercially available grains of hypoeutectoid steel, eutectoid steel, and hypereutectoid steel produced by an atomizing process may be used. Using such carbon steel provides higher corrosion resistance against organic acids or sulfur than a conventional copper alloy. The granular steel phase 6 may include: the above carbon content; and further one or more of up to 1.3 mass % of Si, up to 1.3 mass % of Mn, up to 0.05 mass % of P and up to 0.05 mass % of S; and the balance of Fe and inevitable impurities. While the structure of the steel phase 6 includes: ferrite phase 9 and perlite phase 10; or ferrite phase 9, perlite phase 10 and cementite phase, the structure may include fine precipitates (precipitate phase that cannot be detected by observation of the structure at 1000-fold magnification using a scanning electron microscope). Reaction phase that is produced by reaction with the Ni—P alloy phase 7 may be formed on a surface of the granular steel phase 6 (a surface facing the Ni—P alloy phase 7). Since the porous sintered layer 4 includes the granular steel phase 6 and the Ni—P alloy phase 7, it has high corrosion resistance against organic acids or sulfur.

The pores and the surface of the porous sintered layer 4 are impregnated or covered with the resin composition 5. As shown in FIG. 2, the resin composition 5 is in contact with the surface of the granular steel phase 6 or the surface of the Ni—P alloy phase 7 in the porous sintered layer 4. The resin composition 5 may include typical resin compositions used for sliding applications. Specifically, the resin composition may include one or more of fluororesin, polyetheretherketone, polyamide, polyimide, polyamide-imide, polybenzimidazole, epoxy, phenol, polyacetal, polyethylene, polypropylene, polyolefin, and polyphenylene sulfide, and further include, as a solid lubricant, one or more of graphite, graphene, graphite fluoride, molybdenum disulfide, fluororesin, polyethylene, polyolefin, boron nitride, and tin disulfide. One or more of granular or fibrous metal, metal compound, ceramic, inorganic compound, and organic compound may be incorporated as a filler into the resin composition 5. The resin, the solid lubricant and the filter that constitute the resin composition 5 are not limited to the examples given here.

FIG. 2 shows a structure of the steel phase 6 composed of the ferrite phase 9 and the perlite phase 10. The ferrite phase 9 includes a small amount of carbon of up to 0.02 mass % and thus has a composition close to pure iron. On the other hand, the perlite phase 10 has a lamellar structure of ferrite phase and cementite phase of iron carbide ($Fe_3C$), which form alternating laminar layers. The perlite phase 10 includes a larger amount of carbon than the ferrite phase 9. As shown in FIG. 2, the low perlite phase part 8 is formed in a surface of the steel phase 6 facing the resin composition 5 or the Ni—P alloy phase 7. A ratio of the perlite phase 10 in the low perlite phase part 8 is lowered by 50% or more compared with the perlite phase 10 in the structure at a central part of the grain of the steel phase 6. The low perlite phase part 8 is an annular layer portion mainly formed of the ferrite phase 9 adjacent to the surface of the grain of the steel phase 6 in a cross-sectional structure of the steel phase 6 in FIG. 2. It is permitted that 20% or less of the grains of the steel phases 6 in total granular steel phases 6 that constitute the porous sintered layer 4 (or 20 volume % or less of a total volume of the steel phases 6) is not provided with the low perlite phase part 8.

In the embodiment, a cross-sectional structure of the sliding member 1 was observed in a direction parallel to a thickness direction with use of an electron microscope, and electron images of the grains of the plurality of (for example, five) steel phases 6 near the central part and near the surface facing the resin composition 5 or the Ni—P alloy phase 7 in the sliding layer 3 were taken at 1000-fold magnification. The images were analyzed by a typical image analysis method (analysis software: Image-Pro Plus (Version 4.5) by Planetron, Inc.) to measure an area ratio of the perlite phase 10 in the structure. Thus, it can be confirmed that the low perlite phase part 8 is formed in the surface of the grain of the steel phase 6 since the area ratio of the perlite phase 10 in the structure near the surface of the grain of the steel phase 6 is lowered by 50% or more compared with the perlite phase 10 in the structure at the central part of the grain of the steel phase 6. The observed area near the central part of the grain of the steel phase 6 does not have to be strictly at a center position of the grain. This is because the steel phase 6 has substantially the same structure (that is, the area ratio of the perlite phase 10 does not change around the center position).

A thickness of the low perlite phase part 8 is 1-30 μm from the interface with the resin composition 5 or the Ni—P alloy phase 7. The thickness of the low perlite phase part 8 is preferably 1-10 μm. The thickness is preferably not greater than 20% of an average grain size of the steel phase 6. The low perlite phase part 8 having a thickness of not greater than 30 μm does not affect strength of the steel phase 6. On the other hand, if the thickness is less than 1 μm, the low perlite phase part 8 may partially fail to be formed in the surface of the steel phase 6.

The low perlite phase part 8 in the steel phase 6 facing the resin composition 5 or the Ni—P alloy phase 7 includes Ni diffused from the Ni—P alloy phase 7 in the porous sintered layer 4. Ni in the low perlite phase part 8 dissolves in the ferrite phase 9 near the surface. Although an amount of Ni diffused from the Ni—P alloy phase 7 into the low perlite phase part 8 is very trace, it is observed by electron probe microanalyzer (EPMA) measurement that Ni is diffused into the low perlite phase part 8. It can be also confirmed that Ni in the low perlite phase part 8 is dissolved in the ferrite phase 9, and a Ni concentration decreases gradually toward the inside from a surface of the low perlite phase part 8 facing the resin composition 5 or the Ni—P alloy phase 7. $Ni_3P$ phase (intermetallic compound) is not produced in the low perlite phase part 8.

Due to the Ni diffusion, an amount of the perlite phase 10 is particularly low on the surface of the low perlite phase part 8 in the steel phase 6. The area ratio of the perlite phase 10 on the surface of the low perlite phase part 8 is preferably 0-10% in order to increase bonding strength between the low perlite phase part 8 and the resin composition 5 or the Ni—P alloy phase 7. The area ratio of the perlite phase 10 on the surface of the steel phase 6 can not be directly measured. However, it can be confirmed as follows. A cross-sectional structure of the sliding member 1 is observed in a direction parallel to a thickness direction with use of an electron microscope, and electron images of the grains of the plurality of (for example, five) steel phases 6 are taken at 1000-fold magnification, and the images are analyzed by a typical image analysis method (analysis software: Image-Pro Plus (Version 4.5); manufactured by Planetron, Inc.) to measure a length ratio of a profile line of the perlite phase 10 in relation to an entire length of a profile line of the steel phase 6, or a length ratio of a portion corresponding to the perlite phase 10 of the profile line which constitutes an outer periphery of the steel phase 6).

Figure 3:
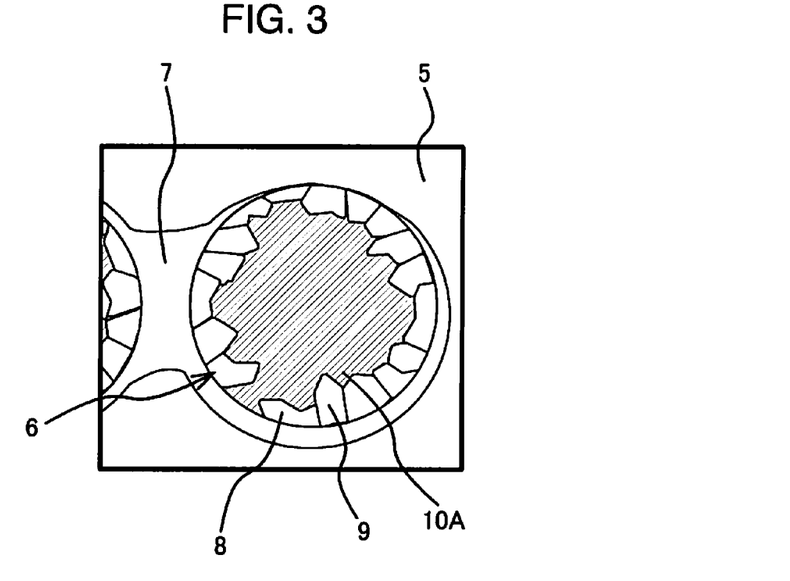
FIG. 3 is an enlarged view showing a structure of a granular steel phase according to a variant of the first embodiment.

FIG. 3 is an enlarged view showing another form of a structure of the steel phase 6. As shown in FIG. 3, when the steel phase 6 is made of a hypereutectoid steel powder including higher than 0.8 mass % of carbon, the structure of the grain of the steel phase 6 includes ferrite phase 9, perlite phase 10 and cementite phase. The low perlite phase part 8 composed of the ferrite phase 9 and the perlite phase 10 is formed near a surface of the grain of the steel phase 6. The structure of the steel phase 6 at the central part of the grain may have a small amount of ferrite phase 9 and a mixed phase 10A of the perlite phase and the cementite phase. In the case, an area ratio of the perlite phase 10 in the structure near the surface of the grain of the steel phase 6 is lowered by 50% or more compared with the mixed phase 10A of the perlite phase and the cementite phase in the structure at the central part of the grain. Thus, it can be confirmed that the low perlite phase part 8 is formed in the surface of the steel phase 6. The mixed phase 10A of the perlite phase and the cementite phase may include bainite phase, sorbite phase, troostite phase, martensite phase, or the like.

In the embodiment, since the low perlite phase part 8 is formed in the surface of the steel phase 6 in the porous sintered layer 4, which faces the resin composition 5 in the sliding layer 3, and the ratio of the perlite phase 10 is lowered by 50% or more compared with the inside of the grain of the steel phase 6, shearing is not likely occur at an interface between the resin composition 5 and the porous sintered layer 4. Also, since the low perlite phase part 8 is formed in the surface of the steel phase 6 facing the Ni—P alloy phase 7, shearing is not likely occur at an interface between the Ni—P alloy phase 7 and the steel phase 6 due to a difference in coefficient of thermal expansion between the ferrite phase 9 and the perlite phase 10.

Next, a process for producing the sliding member 1 according to the embodiment will be described. First, a mixed powder of an atomized carbon steel powder including 0.3-1.3 mass % of carbon and an atomized Ni—P alloy powder are prepared. In preparing the mixed powder, it is necessary to add a component which forms the Ni—P alloy phase 7, in a form of the Ni—P alloy powder, in the porous sintered layer 4. When the Ni—P alloy phase 7 includes an optional element of B, Si, Cr, Fe, Sn, Cu or the like, it is necessary to prepare a mixed powder of the atomized carbon steel powder and the atomized Ni—P alloy powder including the optional elements. The prepared mixed powder is spread on a back metal at a room temperature, and then the mixed powder is sintered in a reducing atmosphere at 930-1000° C. in a sintering furnace without pressurizing the spread powder layer. The back metal layer may be a conventionally typical plate or strip of a carbon steel, austenitic stainless steel, ferrite stainless steel, a Ni alloy or the like, while it is not limited to them. The back metal may have a different composition.

During sintering, the Ni—P alloy grains including 9-13 mass % of P and balance of Ni start to melt when the temperature reaches 880° C. in the heating process. The liquid phase flows between grains of the carbon steel (steel phase 6) or between the grains of the carbon steel (steel phase 6) and a surface of the back metal layer 2, and the porous sintered layer 4 starts to be formed on the surface of the back metal layer 2. The Ni—P alloy grains completely liquefy at 950° C.

For reference, a Ni—P alloy grains which include 10-12 mass % of P and balance of Ni completely liquefy at 930° C.

The sintering temperature is set at or above a temperature at which the Ni—P alloy grains completely melts. As described later, the composition of the Ni—P alloy is selected such that the Ni—P alloy completely melts at or above a temperature (A3 transformation point) at which the structure of the carbon steel (steel phase 6) completely transforms into austenite.

Before sintering, the carbon steel including 0.3-1.3 mass % of carbon has a structure of ferrite phase 9 and perlite phase 10, a structure of perlite phase 10, or a structure of perlite phase 10 and cementite phase. When a temperature reaches 727° C. (A1 transformation point) in the heating step during the sintering, the structures start transforming into an austenitic phase, and are completely austenitized at 900° C. Since the austenitic phase has a larger interstice (distance) between Fe atoms than that of the ferrite phase 9, Ni atoms in the Ni—P alloy phase 7 in the porous sintered layer 4 are likely to be diffused and enter the interstice. As described above, the Ni—P alloy composition is selected such that the Ni—P alloy completely melts at or above the temperature (A3 transformation point) at which the structure of the steel phase 6 is completely austenitized, and the sintering temperature is set at or above the temperature at which the Ni—P alloy grains completely melt. This is because the Ni atoms are more likely to be diffused into the austenitic phase in the surface of the steel phase 6 when the Ni—P alloy phase 7 is in the liquid phase than a solid phase.

The Ni atoms are diffused not only in portions of the steel phase 6 in contact with the Ni—P alloy phase 7, but also it diffuses from the contact portions to the surface that is not in direct contact with the Ni—P alloy phase 7 (surface in contact with the resin composition 5).

In combination of the facts that the Ni—P alloy completely liquefies and that the structure of the steel phase 6 completely transforms into austenite during the sintering, the Ni atoms diffuse into the surface of the steel phase 6. Since the Ni atoms dissolve in the austenitic phase, carbon atoms having dissolved in the interstices of Fe atoms in the austenitic phase are forced out and diffuse inward (toward the central part of the grain) of the steel phase 6. The Ni atoms in the liquid phase diffuse into the austenitic phase in the surface of the steel phase 6. Since the Ni atoms dissolve and simultaneously solidified, the diffusion of the Ni atoms is limited only in an area near an extreme surface of the steel phase 6.

When the temperature returns to 727° C. (A1 transformation point) or lower in a cooling step after sintering, the steel phase 6 turns back to the structure of the ferrite phase 9 and the perlite phase 10, the structure of the perlite phase 10, or the structure of the ferrite phase 9, the perlite phase 10 and the cementite phase. The above is presumed to be the mechanism that the grain of the steel phase 6 near the central part has a normal structure of the ferrite phase 9 and the perlite phase 10, the structure of the perlite phase 10, or the structure of the ferrite phase 9, the perlite phase 10 and the cementite phase (or the structure of the ferrite phase 9 and the mixed phase 10A of the perlite phase and the cementite phase) depending on the carbon content, and that the low perlite phase part 8 is formed near the surface of the steel phase 6, which has the ratio of the perlite phase 10 lowered compared with the perlite phase 10 in the structure at the central part (the mixed phase 10A of the perlite phase and the cementite phase when structure at the central part has the mixed phase 10A of the perlite phase and the cementite phase,) (the extreme surface of the steel phase 6 has a structure substantially composed of the ferrite phase 9). Please note that Ni dissolves in the ferrite phase 9 near the surface of the low perlite phase part 8.

A previously prepared resin composition 5, which may be diluted by an organic solvent, is impregnated in the porous sintered layer 4 on the surface of the back metal layer 2 so that the resin composition 5 fills pores and covers a surface of the porous sintered layer 4. Then, the member is heated to dry and bake the resin composition 5, and thus the sliding layer 3 including the porous sintered layer 4 and the resin composition 5 is formed on the surface of the back metal layer 2.

A carbon steel powder produced by atomizing process is desirable as a material for the steel phase 6 in the embodiment. Distortion or vacancy is introduced in the crystalline of the atomized carbon steel powder. The distortion induces a defect of an atomic-level interstice that an Fe atom is absent at a site where it is to be present in the crystalline structure of the carbon steel. While the distortion of the crystals in the steel phase 6 (the carbon steel) moves gradually toward the surface of the steel phase 6 in the heating step during the sintering and disappears there, Ni atoms in the Ni—P alloy phase 7 diffuses into the portions where the distortion has been present in the crystals on the surface side of the steel phase 6 and replace the distortion. On the other hand, if a crushed powder obtained by mechanically crushing massive cast steel is used, the crushed powder has extremely lower distortion in its crystals than the atomized powder, and the Ni atoms are less likely to diffuse into the surface of the steel phase 6.

In the embodiment, the mixed powder of the atomized carbon steel powder and the atomized Ni—P alloy powder is used as described above. If components of the steel phase and the Ni—P alloy phase is previously alloyed, that is, an atomized Fe—Ni—P—C alloy powder is used, the porous sintered layer has a structure including free cementite phase ($Fe_3C$), Fe—P compound phase ($Fe_2P$, $Fe_3P$) or Ni—P compound phase ($Ni_3P$) in a matrix of Fe—Ni alloy phase, which reduces strength of the porous sintered layer. If a mixed powder of a Ni powder and an Fe—P—C alloy powder is used, only a part of Ni in the powder composition liquefies during the sintering, and thus a small amount of liquid phase is generated and diffusion of the Ni atoms into the surface of the steel phase hardly occurs. Thus, the low perlite phase part, in which the ratio of the perlite phase is lowered, is not formed in the surface of the steel phase. Since the liquid phase mainly includes $Ni_3P$, the $Ni_3P$ phase (intermetallic compound) is formed between the Ni phase and the steel phase after the sintering. The $Ni_3P$ phase is hard but brittle, and thus reduces strength of the porous sintered layer.

When the Ni—P alloy phase 7 in the porous sintered layer 4 in the embodiment includes an optional element of B, Si, Cr, Fe, Sn, Cu or the like, the mixed powder of the atomized Ni—P alloy powder including the optional element and the atomized carbon steel powder is prepared and sintered on the back metal. Unlike the embodiment, if the mixed powder includes single powder of the optional element such as B, Si, Cr, Fe, Sn or Cu or an alloy powder of the optional element, a binder portion that binds the granular steel phases 6 with one another in the porous sintered layer 4 and/or binds the steel phases 6 with the back metal includes the Ni—P alloy phase, phase of the optional element, and reaction phase between the Ni—P alloy phase and the phase of the optional element, thereby strength of the porous sintered layer is reduced. In particular, the mixed powder should not include Sn in a form of a pure Sn powder or a Sn-base alloy. The pure Sn and the Sn-base alloy have a low melting point, and liquefy at about 232° C. at a very initial stage of the heating step during the sintering. The liquefied Sn atoms react with Fe atoms in the surface of the steel phase, and thus $Fe_2Sn$ phase or $Fe_3Sn$ phase (intermetallic compound) is formed between the Ni—P alloy phase and the steel phase, while the low perlite phase part is not formed in the surface of the steel phase. The $Fe_2Sn$ phase and the $Fe_3Sn$ phase are hard but brittle, and thus extremely reduce bonding strength between the Ni—P alloy phase and the steel phase.

In the embodiment, the low perlite phase part 8 is formed in the surface of the steel phase 6 in the porous sintered layer 4. If the carbon steel powder is plated by Fe or Ni previously on the surface, cost of the sliding member increases. According to the embodiment, such a step of plating on the surface of the carbon steel powder can be omitted, and the low perlite phase part 8 is forms in the steel phase 6 simultaneously sintering the porous sintered layer 4. Thus, the sliding member 1 can be produced at low cost.

Second Embodiment

Now, a sliding member 1' according to a second aspect of the present invention will be described.

Figure 4:
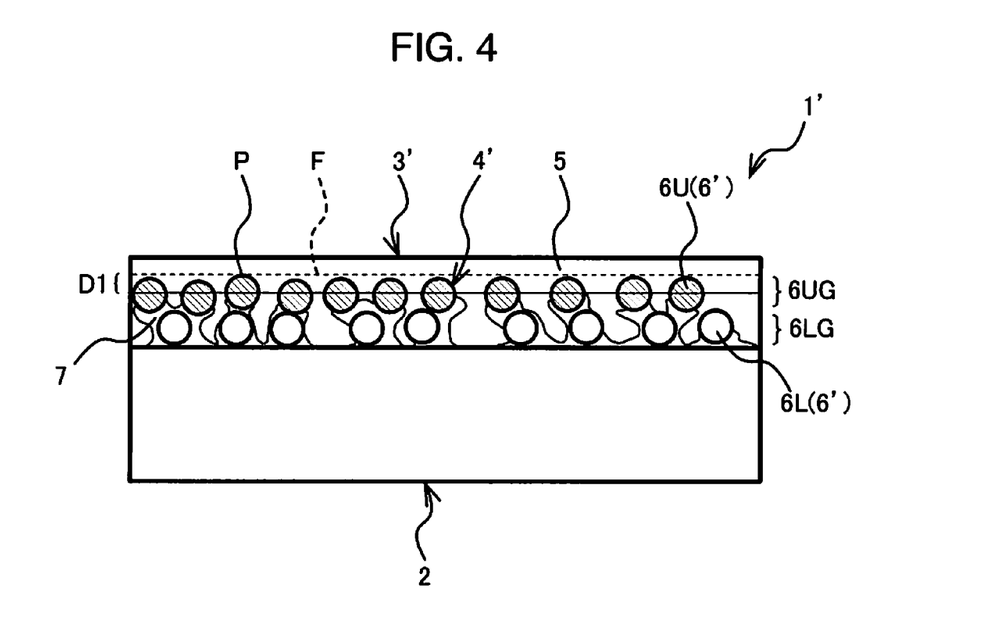
FIG. 4 is a schematic view showing a cross-section of a sliding member according to a second embodiment of the present invention.
Figure 5:
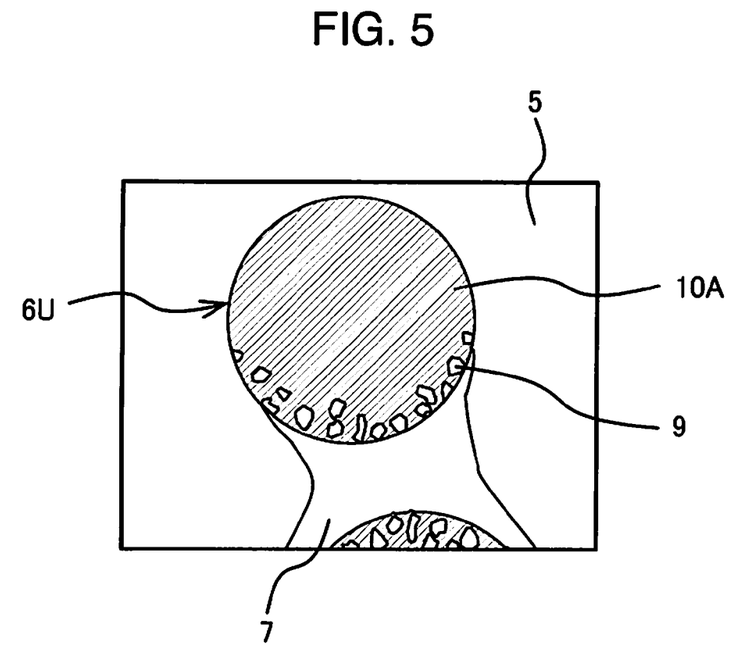
FIG. 5 is an enlarged view showing a structure of a granular steel phase in a sliding surface side steel phase grain group in FIG. 4.
Figure 6:
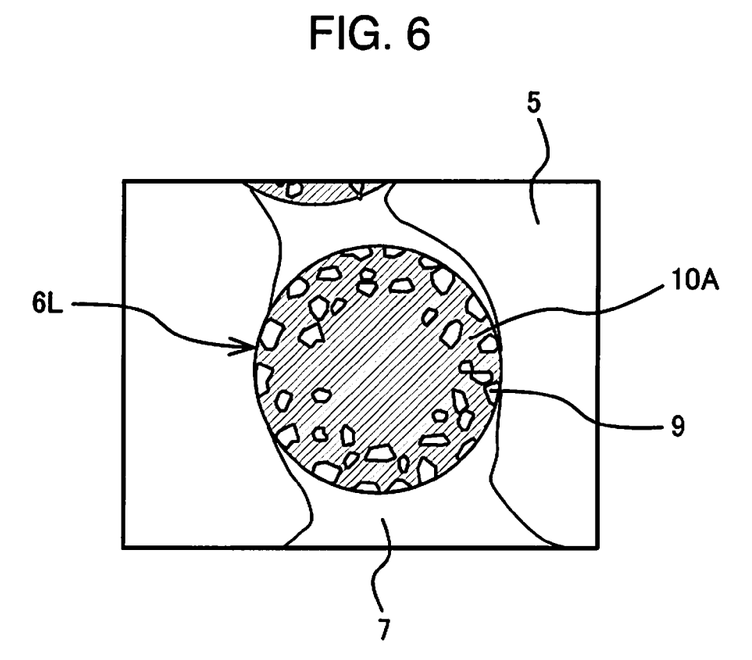
FIG. 6 is an enlarged view showing a structure of a granular steel phase in an interface side steel phase grain group in FIG. 4.

FIG. 4 is a schematic view showing a cross-section of the sliding member 1'. A sliding layer 3' including a porous sintered layer 4' and a resin composition 5' is formed on a surface of a back metal layer 2. The porous sintered layer 4 includes Ni—P alloy phase 7 and granular steel phase 6'. FIG. 5 is an enlarged view showing a structure of a granular steel phase 6U in a sliding surface side steel phase grain group 6UG. FIG. 6 is an enlarged view showing a structure of a granular steel phase 6L in an interface side steel phase grain group 6LG.

As shown in FIG. 4, the sliding member 1' includes the back metal layer 2 and the sliding layer 3', and the sliding layer 3' includes the porous sintered layer 4' on the back metal layer 2 and the resin composition 5 for impregnating pores and covering a surface of the porous sintered layer. The porous sintered layer 4' includes the granular steel phase 6' and the Ni—P alloy phase 7. More than one (about two in FIG. 4) granular steel phases 6' stacks are stacked on the surface of the back metal layer 2 when viewed in a cross-section in a direction perpendicular to a sliding surface of the sliding member 1'. The Ni—P alloy phase 7 functions as a binder that binds the grains of the steel phase 6' with one another and/or binds the grains of the steel phase 6' with the surface of the back metal layer 2. Thus, the grains of the steel phase 6' are bonded with one another and/or the grains of the steel phase 6' and the surface of the back metal layer 2 are bonded via the Ni—P alloy phase 7. Partial direct contact or bond may be formed through sintering between the grains of the steel phase 6' and/or between the grains of the steel phase 6' and the surface of the back metal layer 2. The surfaces of the grains of the steel phase 6' may be partially uncovered with the Ni—P alloy phase 7, while all the surfaces of the grains of the steel phase 6' may be covered with the Ni—P alloy phase 7. In the steel phase 6U placed on a sliding surface side of the porous sintered layer 4', the surface on the sliding surface side of the grain surface is preferably uncovered with the Ni—P alloy phase 7. The porous sintered layer 4' includes pores to be impregnated with the resin composition 5. The porosity thereof is 10-60%, more preferably 20-40%.

The granular steel phase 6' may be made of a carbon steel including 0.8-1.3 mass % of carbon. Commercially available grains of hypoeutectoid steel by atomizing may be used. Using such carbon steel provides higher corrosion resistance against organic acids or sulfur than a conventional copper alloy. The granular steel phase 6' may include the above carbon content, and further one or more of up to 1.3 mass % of Si, up to 1.3 mass % of Mn, up to 0.05 mass % of P and up to 0.05 mass % of S, and the balance of Fe and inevitable impurities. While the structure of the steel phase 6' consists essentially of ferrite phase 9 and a mixed phase 10A of perlite phase and cementite phase, the structure may include fine precipitates (precipitate phase that can not be detected by observation at 1000-fold magnification using a scanning electron microscope). The granular steel phase 6 may include reaction phase which is produced by reaction with a component of the Ni—P alloy phase 7 on its surface (surface facing the Ni—P alloy phase 7). The porous sintered layer 4' includes the granular steel phase 6' and the Ni—P alloy phase 7, and thus has high corrosion resistance against organic acids or sulfur.

The granular steel phase 6' has the structure composed of the ferrite phase 9 and the mixed phase 10A of the perlite phase and the cementite phase. In the steel phase 6U in the sliding surface side steel phase grain group 6UG placed on the sliding surface side of the porous sintered layer 4' among the plurality of steel phases 6' stacked on the back metal layer 2 when viewed in a cross-section of the sliding member 1', an average area ratio of the ferrite phase 9 in the structure is not more than 10%. On the other hand, in the steel phase 6L in the interface side steel phase grain group 6LG placed on the interface side (i.e. interface with the back metal layer 2) of the porous sintered layer 4', the average area ratio of the ferrite phase 9 is not less than 20%. When viewed in a cross-section in a direction perpendicular to the sliding surface of the sliding member 1', among the plurality of steel phases 6' placed on the surface side of the porous sintered layer 4' (the surface of the porous sintered layer 4' on the sliding surface side of the sliding member 1' or an upper side in FIG. 4), a surface of a grain of steel phase 6' located on an uppermost side (a top of a surface closest to the sliding surface) is defined as a reference point P, and a phantom line (broken line in FIG. 4) passing through the reference point P and parallel to the sliding surface indicates a surface F of the porous sintered layer 4'. The sliding surface side steel phase grain group 6UG described above is a group of steel phases 6U including at least part of a cross-section of the steel phase 6' within a depth D1 among the granular steel phases 6' in the porous sintered layer 4', where D1 corresponds to a half of the average grain size of the grain of the steel phase 6' from the surface F of the porous sintered layer toward the interface side of the back metal layer 2. The interface side steel phase grain group 6LG is a group of steel phases 6L placed on the interface side of the back metal layer 2 from the steel phase 6U in the sliding surface side steel phase grain group 6UG among the granular steel phases 6' in the porous sintered layer 4', and a group of the steel phases 6L except the steel phases 6U in the sliding surface side steel phase grain group 6UG.

The granular steel phase 6' in the porous sintered layer 4' may have an average grain size of 45-180 μm. Refer to the description in the first Embodiment in this regard.

In particular, if the average grain size of the steel phase 6' is more than 180 μm, the ratio of the ferrite phase 9 in the structure of the steel phase 6L in the interface side steel phase grain group 6LG may be lowered.

For the composition of the Ni—P alloy phase 7, refer to the description in the first Embodiment.

A ratio of the Ni—P alloy phase 7 in the porous sintered layer 4' may be 5-30 parts by mass, more preferably 10-20 part by mass in relation to 100 part by mass of the porous sintered layer 4'. The ratio of the Ni—P alloy phase 7 is suitable for forming the porous sintered layer 4' where the Ni—P alloy phase 7 is in the form of a binder that binds the grains of the steel phase 6' with one another and/or binds the grains of the steel phase 6' with the surface of the back metal layer 2. If the ratio of the Ni—P alloy phase 7 is lower than 5 part by mass, strength of the porous sintered layer 4' and bonding strength between the porous sintered layer 4' and the back metal layer 2 are insufficient. On the other hand, if the ratio of the Ni—P alloy phase 7 is higher than 30 part by mass, the porous sintered layer 4' has too low porosity since portions which should be left as pores are filled with the liquid-phase Ni—P alloy during the sintering. Also, the ratio of the ferrite phase 9 in the structure of the steel phase 6U in the sliding surface side steel phase grain group 6UG may be increased.

For the resin composition 5, refer to the description in the first Embodiment.

As shown in FIG. 5, the steel phase 6U in the sliding surface side steel phase grain group 6UG has the structure composed of the ferrite phase 9 and the mixed phase 10A of the perlite phase and the cementite phase. In the steel phase 6U in the sliding surface side steel phase grain group 6UG, an average area ratio of the ferrite phase 9 in the structure is not more than 10%. Also as shown in FIG. 5, in the steel phase 6U in the sliding surface side steel phase grain group 6UG, the surface on the sliding surface side of the grain surface is uncovered with the Ni—P alloy phase 7, and an amount of ferrite phase 9 in the structure is particularly small near the surface on the sliding surface side. On the other hand, in the steel phase 6U, the surface on the side of the back metal layer 2 of the grain surface is in contact with the Ni—P alloy phase 7 that functions as a binder, and the amount of ferrite phase 9 in the structure is large near the surface on the side of the back metal layer 2.

As shown in FIG. 6, the steel phase 6L in the interface side steel phase grain group 6LG has the structure composed of the ferrite phase 9 and the mixed phase 10A of the perlite phase and the cementite phase. In the steel phase 6L in the interface side steel phase grain group 6LG, an average area ratio of the ferrite phase 9 in the structure is not less than 20%. The ferrite phase 9 in the steel phase 6L includes a small amount of carbon of up to 0.02 mass % and thus has a composition close to pure iron. On the other hand, the mixed phase 10A of the perlite phase and the cementite phase in the steel phase 6L includes the mixture of: the perlite phase having a lamellar structure of ferrite phase and cementite phase of iron carbide ($Fe_3C$), which form alternating laminar layers; and the cementite phase of iron carbide. The mixed phase 10A of the perlite phase and the cementite phase includes a larger amount of carbon is harder than the ferrite phase 9. As shown in FIG. 6, a larger amount of ferrite phase 9 is formed in the structure near the surface of the steel phase 6L facing the resin composition 5 or the Ni—P alloy phase 7 than in the structure at the central part of the grain of the steel phase 6L. Please note that the term "ferrite phase 9" in this document does not include the ferrite phase that constitutes the perlite phase. The mixed phase 10A of the perlite phase and the cementite phase may include bainite phase, sorbite phase, troostite phase, martensite phase or the like.

The structure of the steel phase 6U in the sliding surface side steel phase grain group 6UG in FIG. 5, and the structure of the steel phase 6L in the interface side steel phase grain group 6LG in FIG. 6 are examples and not limited to the structures as shown in FIGS. 5 and 6. The steel phase 6U and the steel phase 6L may be formed such that the entire surface of the grain is covered with the Ni—P alloy phase 7 or that the ferrite phase 9 is uniformly distributed in the structure.

In the embodiment, cross-sectional structures of a plurality of (for example, three) areas in the sliding member 1' in a direction parallel to a thickness direction are observed with an electron microscope, and electron images are taken at 500-fold magnification and analyzed by a typical image analysis method (analysis software: Image-Pro Plus (Version 4.5) by Planetron, Inc.) to divide the images into the steel phase 6U in the sliding surface side steel phase grain group 6UG and the steel phase 6L in the interface side steel phase grain group 6LG. Then, are measured, by this method, average area ratios of the ferrite phase 9 in the structure of the steel phase 6U in the sliding surface side steel phase grain group 6UG and in the structure of the steel phase 6L in the interface side steel phase grain group 6LG.

Ni atoms from the Ni—P alloy phase 7 is diffused into the steel phase 6' in the porous sintered layer 4'. This can increase bonding strength with the resin composition 5 or the Ni—P alloy phase 7 in the sliding layer 3'. Refer to the description in the first Embodiment in this regard.

Figure 7:
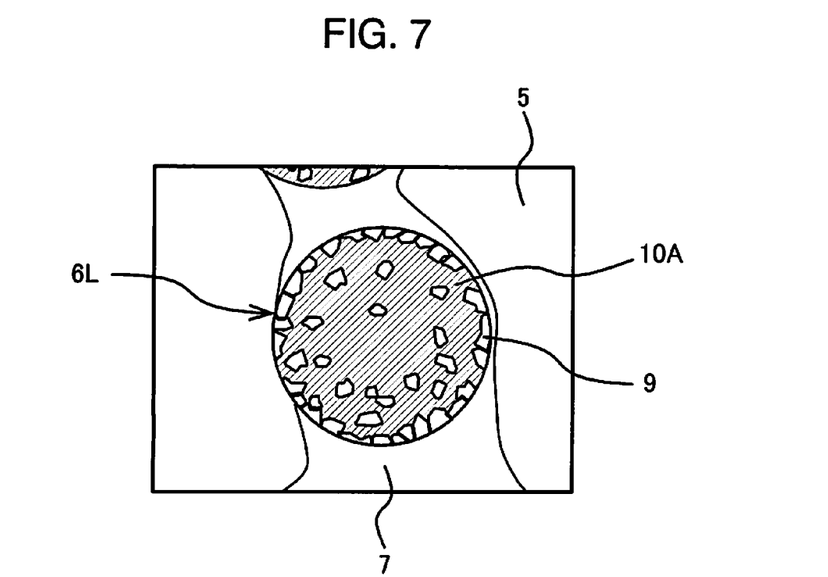
FIG. 7 is an enlarged view showing a structure of a granular steel phase in another interface side steel phase grain group.

FIG. 7 is an enlarged view showing another structure of a steel phase 6L in an interface side steel phase grain group 6LG. In the steel phase 6L, a larger amount of ferrite phase 9 is formed particularly near a surface of a grain than in the steel phase 6L in FIG. 6. As shown in FIG. 7, an area ratio of the ferrite phase 9 on the surface of the grain in the steel phase 6L in the interface side steel phase grain group 6LG is not less than 50%, and also a volume ratio of the ferrite phase 9 is not less than 50% in relation to a total volume of the steel phase 6L in the interface side steel phase grain group 6LG. This can further increase bonding strength with the resin composition 5 or the Ni—P alloy phase 7 in the sliding layer 3'.

The area ratio of the ferrite phase 9 on the surface of the grain of the steel phase 6L can not be directly measured. However, it can be measured as follows. Cross-sectional structures of a plurality of (for example, three) areas in the sliding member 1' in a direction parallel to a thickness direction are observed with an electron microscope, and electron images are taken at 500-fold magnification and analyzed by a typical image analysis method (analysis software: Image-Pro Plus (Version 4.5) by Planetron, Inc.) to measure a length ratio of a profile line of the ferrite phase 9 in relation to an entire length of a profile line of each steel phase 6L (a length ratio of a portion corresponding to the ferrite phase 9 of a profile line which constitutes an outer periphery of the steel phase 6L) in the images. Then, total areas (A1) of all the steel phases 6L in the interface side steel phase grain group 6LG in the images, and total areas (A2) of the steel phases 6L in which the area ratio of the ferrite phase 9 in the surface of the grain is not less than 50% are measured to calculate a ratio A2/A1, thereby the volume ratio (volume fraction) of the steel phase 6L in which the area ratio of the ferrite phase 9 in the surface of the grain is not less than 50% in relation to a total volume of the steel phase 6L in the interface side steel phase grain group 6LG is measured.

Figure 8:
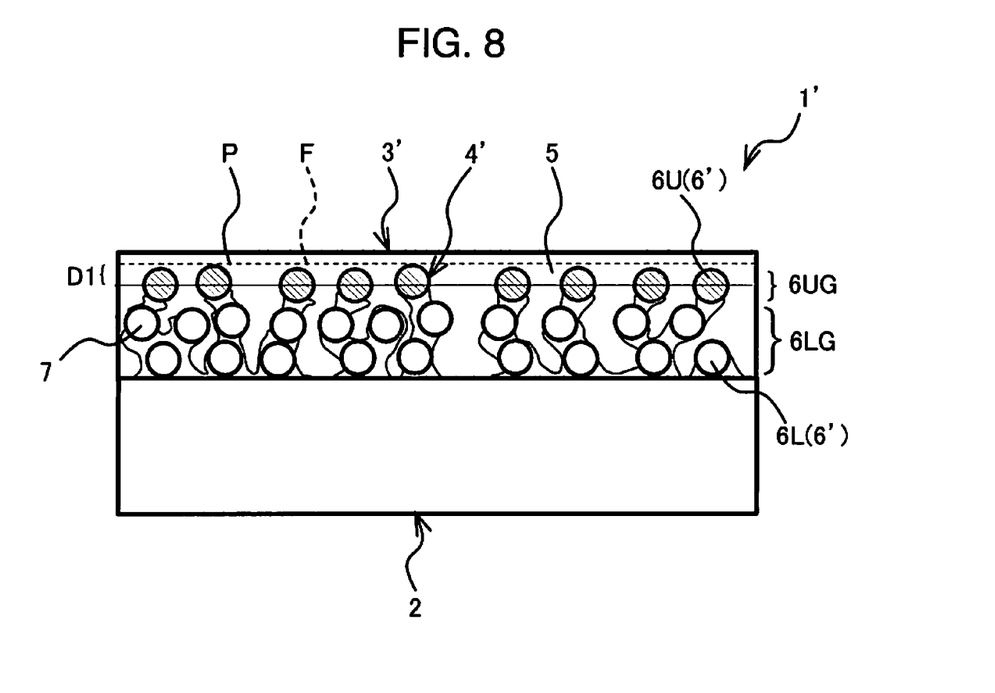
FIG. 8 is a schematic view showing a cross-section of a sliding member provided with a sliding layer according to a variant of the second embodiment.

FIG. 8 is a schematic view showing a cross-section of a sliding member 1' provided with a porous sintered layer 4' according to another embodiment. As shown in FIG. 8, three granular steel phases 6' stacks are stacked in the porous sintered layer 4' on a surface of a back metal layer 2 when viewed in a cross-section in a direction perpendicular to a sliding surface of the sliding member 1', and a larger number of granular steel phases 6' stacks are stacked on the surface of the back metal layer 2 than in the porous sintered layer 4' in FIG. 4. Four or more granular steel phases 6' stacks may be stacked on the surface of the back metal layer 2.

In the embodiment, the steel phase 6' in the porous sintered layer 4' facing the resin composition 5 in the sliding layer 3' is made of a carbon steel (hypereutectoid steel) powder having a structure composed of perlite phase and cementite phase, while the steel phase 6' in the porous sintered layer 4' after sintering has a structure composed of ferrite phase 9 and mixed phase 10A of the perlite phase and the cementite phase. A plurality of the steel phases 6' stacks is stacked on the surface of the back metal layer 2 through the Ni—P alloy phase 7 as a binder. For an interface side steel phase grain group 6LG placed on an interface side of the porous sintered layer 4', an average area ratio of the ferrite phase 9 in the structure of the granular steel phase 6L is not less than 20%. Thus, difference in thermal expansion at an interface between the resin composition 5 and the steel phase 6L in the interface side steel phase grain group 6LG is small. Thus, shearing is less likely to occur at the interface therebetween, and bonding strength increases between the resin composition 5 and the granular steel phase 6. Also, bonding strength between the Ni—P alloy phase 7 and the steel phase 6L in the interface side steel phase grain group 6LG can be increased to increase strength of the porous sintered layer 4'.

The cementite phase is iron carbide ($Fe_3C$). Since the perlite phase includes cementite, it has a low coefficient of thermal expansion. The ferrite phase 9 includes a small amount of carbon of up to 0.02 mass % and thus has a composition close to pure iron, and has a higher coefficient of thermal expansion than the cementite phase or the perlite phase. Therefore, the ferrite phase 9 has a small difference in coefficient of thermal expansion from the resin composition 5 in the sliding layer 3'. Thus, in a portion of the ferrite phase 9 exposed on the surface of the grain of the steel phase 6L facing the resin composition 5 in the sliding layer 3', a lower shearing force is generated by the difference in thermal expansion at the interface between the surface of the grain of the steel phase 6L and the resin composition 5, thereby increasing bonding strength. The ferrite phase 9 in the steel phase 6L has higher bonding strength with the Ni—P alloy phase 7 than the mixed phase 10 of the perlite phase and the cementite phase, thereby increasing strength of the porous sintered layer 4'.

On the other hand, for the steel phase 6U in the sliding surface side steel phase grain group 6UG placed on the sliding surface side of the porous sintered layer 4', an average area ratio of the ferrite phase 9 in the structure is not more than 10%. When the sliding member 1' is used and the resin composition 5 covering the surface of the porous sintered layer 4 wears, the granular steel phase 6U in the sliding surface side steel phase grain group 6UG placed on the sliding surface side of the porous sintered layer 4' is exposed. However, the steel phase 6U has sufficient hardness since the average area ratio of the ferrite phase 9 in the structure is not more than 10%, thereby increasing wear resistance of the sliding layer 3' in the sliding member 1'. The steel phase 6L in the interface side steel phase grain group 6LG has lower hardness than the steel phase 6U in the sliding surface side steel phase grain group 6UG since the average area ratio of the ferrite phase 9 in the structure is not less than 20%. It is not exposed on the sliding surface, and does not affect the wear resistance of the sliding layer 3'.

Next, a process for producing the sliding member 1' according to the embodiment will be described. First, a mixed powder of atomized carbon steel powder including 0.8-1.3 mass % of carbon and an atomized Ni—P alloy powder are prepared. In preparing the mixed powder, it is necessary to add a component which forms the Ni—P alloy phase 7, in a form of the Ni—P alloy powder, in the porous sintered layer 4'. When the Ni—P alloy phase 7 includes an optional element of B, Si, Cr, Fe, Sn, Cu or the like, it is necessary to prepare a mixed powder of the atomized carbon steel powder and the atomized Ni—P alloy powder including the optional element. A Ni—P alloy powder having an average grain size of 10-30% in relation to an average grain size of the carbon steel powder (steel phase 6') needs to be used. A ratio of the Ni—P alloy powder in the mixed powder is preferably 5-30 part by mass in relation to 100 part by mass of the mixed powder.

Figure 9:
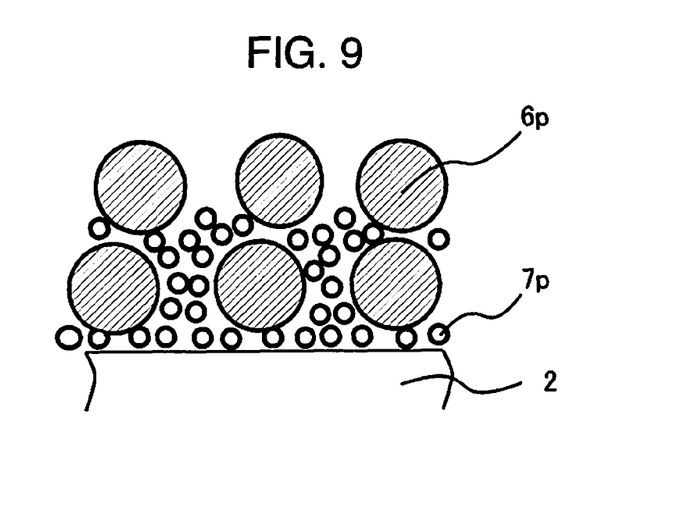
FIG. 9 is a schematic view showing a cross-section of a state in which a powder is spread on a surface of a back metal layer.

Then, the prepared mixture powder is spread on back metal at a room temperature to form a spread powder layer. FIG. 9 shows the spread powder layer before sintering. As shown in FIG. 9, a plurality of (two in FIG. 9) stacks of carbon steel powders 6p (steel phases 6') is stacked in the spread powder layer on a surface of the back metal layer 2. If a Ni—P alloy powder 7p having an average grain size of 10-30% in relation to an average grain size of the carbon steel powder 6p (steel phase 6') is used, a large amount of the Ni—P alloy powder 7p exists in an interstice between the carbon steel powders 6p (steel phases 6') or an interstice between the carbon steel powders 6p (steel phase 6') and the surface of the back metal layer 2. This reduces an amount of the Ni—P alloy powder 7p near a surface of the spread powder layer, which will form a surface of the porous sintered layer 4', in comparison with an inside of the spread powder layer. This is because an average grain size of the carbon steel powder 6p and an average grain size of the Ni—P alloy powder 7p are selected so that the Ni—P alloy powder 7p spread on near the surface of the spread powder layer is influenced by gravity or vibration during spreading and easily flows through the interstice between the carbon steel powders 6p (steel phase 6') toward the interface with the surface of the back metal layer 2 when the mixed powder is spread on the surface of the back metal layer 2.

Then, the mixed powder is sintered in a reducing atmosphere at 930-1000° C. in a sintering furnace without pressurizing the spread powder layer. Refer to the description in the first Embodiment in this regard.

When the temperature returns to 727° C. (A1 transformation point) or lower in a cooling step after the sintering, the structure of the steel phase 6' that has been in an austenitic phase turns back to the structure of the ferrite phase 9 and the mixed phase 10A of the perlite phase and the cementite phase. It is considered that the ferrite phase appears in the structure of the steel phase 6' as following reason. When the structure of the steel phase 6' has been in the austenitic phase, a portion with a low carbon concentration due to the diffusion of Ni atoms is partially formed in the austenitic phase structure in the steel phase 6', and the austenitic phase in the portion with the low carbon concentration has transformed into ferrite phase and perlite phase when the temperature returns to 727° C. (A1 transformation point) or lower in the cooling step. With the mechanism described above, hypereutectoid steel (generally, having a structure of perlite phase and cementite phase) including 0.8-1.3 mass % of carbon is used as the steel phase 6', while the structure after the sintering has the ferrite phase 9 and the mixed phase 10A of the perlite phase and the cementite phase.

As shown in FIG. 9, a ratio of the Ni—P alloy powder 7p for forming the Ni—P alloy phase 7 after sintering is lowered on the surface side of the spread powder layer before sintering. Thus, the diffusion of the Ni atoms of the Ni—P alloy into the carbon steel powder 6p (steel phase 6') is unlikely to occur for the carbon steel powder 6p (steel phase 6U) stacked on the surface side of the spread powder layer, and is likely to occur for the carbon steel powder 6p (steel phase 6L) stacked on the interface side of the spread powder layer with the back metal layer 2. Thus, an average area ratio of the ferrite phase 9 in the structure after sintering is low, not more than 10% in the steel phase 6U in the sliding surface side steel phase grain group 6UG placed on the sliding surface side of the porous sintered layer 4' among the plurality of stacked steel phases 6' when viewed in a cross-section. On the other hand, the average area ratio of the ferrite phase 9 is high, not less than 20%, in the steel phase 6L in the interface side steel phase grain group 6LG placed on the interface side of the porous sintered layer 4'.

A smaller number of Ni atoms are diffused into the steel phase 6U in the sliding surface side steel phase grain group 6UG than into the steel phase 6L in the interface side steel phase grain group 6LG. In particular, the Ni atoms are not diffused or are merely slightly diffused into the surface on the sliding surface side the grain of the steel phase 6U. For the steel phase 6U placed on the sliding surface side of the porous sintered layer 4', since the surface on the sliding surface side of the grain is not covered with the Ni—P alloy phase 7, the surface on the sliding surface side of the porous sintered layer 4' can be formed of the surface of the granular steel phase 6U.

The steel phase 6L in the interface side steel phase grain group 6LG which has an area ratio of the ferrite phase 9 on the surface of the grain being not less than 50% may have a volume ratio of the ferrite phase 9 being not less than 50% in relation to a total volume of the steel phase 6L in the interface side steel phase grain group 6LG. In the case, the average area ratio of the ferrite phase 9 in the structure of the steel phase 6L after sintering can be increased by:

using a carbon steel including a small amount of carbon (for example, a carbon steel powder including 0.8-1.1 mass % carbon) as the carbon steel powder (steel phase 6') in a preparation step of the mixed powder, increasing a ratio of the Ni—P alloy phase 7 in the porous sintered layer 4' to 25-30 part by mass, or adjusting a sintering temperature or a heating time period to increase the number of Ni atoms diffused into the surface of the grain of the steel phase 6L.

As described above, the member having the porous sintered layer 4' on the surface of the back metal layer 2 is impregnated with the previously prepared resin composition 5 (which may be diluted by an organic solvent) so that the resin composition 5 fills pores in the porous sintered layer 4' and covers the surface of the porous sintered layer 4'. Then, the member is heated to dry and bake the resin composition 5, and thus the sliding layer 3' including the porous sintered layer 4' and the resin composition 5 is produced on the surface of the back metal layer 2. In the sliding member 1' according to the embodiment, the sliding surface may be previously cut or ground so that the steel phase 6U in the sliding surface side steel phase grain group 6UG in the porous sintered layer 4' is exposed on the sliding surface.

A carbon steel powder manufactured by atomizing is desirably used as a material for the steel phase 6' in the embodiment. Refer to the description in the first Embodiment in this regard.

If the Ni—P alloy phase 7 in the porous sintered layer 4' in the embodiment includes an optional element of B, Si, Cr, Fe, Sn, Cu or the like, a mixed powder of an atomized Ni—P alloy powder including the optional element and an atomized carbon steel powder is prepared and sintered on the back metal as described above. Refer to the description in the first Embodiment in this regard.

In the embodiment, although the steel phase 6U in the sliding surface side steel phase grain group 6UG and the steel phase 6L in the interface side steel phase grain group 6LG in the porous sintered layer 4' are made of a carbon steel (hypereutectoid steel) powder having the same composition, they have different ratios of the ferrite phase 9 in the structure, thereby the sliding member can be produced at a low cost. In contrast, if two types of carbon steel (hypoeutectoid steel) powders having different compositions including different carbon contents and having different ratios of the ferrite phase in the structure are separately spread on the back metal layer in advance, dimensional accuracy of a thickness of the porous sintered layer is reduced, and spreading steps are increased to increase the cost of the sliding member.

The invention claimed is:

1. A sliding member comprising: a back metal layer; and a sliding layer on the back metal layer, the sliding layer including a porous sintered layer and a resin composition, wherein the porous sintered layer includes Ni—P alloy phase and granular steel phase, the granular steel phase being made of a carbon steel including 0.3-1.3 mass % of carbon and having a structure consisting essentially of:

ferrite phase; and perlite phase and optionally cementite phase, wherein the Ni—P alloy phase functions as a binder for binding the granular steel phases with one another and/or for binding the granular steel phases with the back metal layer, wherein the granular steel phase includes a low perlite phase part in a surface of a steel phase granule, the low perlite phase part having an area ratio of the perlite phase being not more than 50% of a total area ratio of the perlite phase and, if present, the cementite phase in the structure at a central part of the steel phase granule when observed in a cross-section.

2. The sliding member according to claim 1, wherein the granular steel phase has an average grain size of 45-180 μm.

3. The sliding member according to claim 1, wherein nickel from the Ni—P alloy phase is diffused into the low perlite phase part.

4. The sliding member according to claim 1, wherein the low perlite phase part has a thickness of 1-30 μm.

5. The sliding member according to claim 1, wherein an area ratio of the perlite phase on a surface of the low perlite phase part is 0-10%.

6. The sliding member according to claim 1, wherein the Ni—P alloy phase has a composition consisting of 9-13 mass % of P, optionally one or more selected from 1-4 mass % of B, 1-12 mass % of Si, 1-12 mass % of Cr, 1-3 mass % of Fe, 0.5-5 mass % of Sn, and 0.5-5 mass % of Cu, and the balance of Ni and inevitable impurities.

7. The sliding member according to claim 1, wherein a ratio of the Ni—P alloy phase in the porous sintered layer is 5-40 part by mass in relation to 100 part by mass of the porous sintered layer.

* * * * *